United States Patent
Hosoda et al.

(10) Patent No.: US 10,756,590 B2
(45) Date of Patent: Aug. 25, 2020

(54) STATOR AND CONDUCTOR-WIRE WINDING METHOD

(71) Applicant: HONDA MOTOR CO., LTD., Tokyo (JP)

(72) Inventors: Yuichi Hosoda, Tochigi (JP); Ryosuke Fukuchi, Tochigi (JP); Kei Hitomi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 16/084,399

(22) PCT Filed: Feb. 6, 2017

(86) PCT No.: PCT/JP2017/004260
§ 371 (c)(1),
(2) Date: Sep. 12, 2018

(87) PCT Pub. No.: WO2017/159115
PCT Pub. Date: Sep. 21, 2017

(65) Prior Publication Data
US 2019/0068019 A1 Feb. 28, 2019

(30) Foreign Application Priority Data
Mar. 17, 2016 (JP) ................................ 2016-054248

(51) Int. Cl.
*H02K 3/14* (2006.01)
*H02K 3/28* (2006.01)
(Continued)

(52) U.S. Cl.
CPC ............... *H02K 3/28* (2013.01); *H01F 41/06* (2013.01); *H02K 1/18* (2013.01); *H02K 15/095* (2013.01);
(Continued)

(58) Field of Classification Search
CPC ........................................................ H02K 3/14
See application file for complete search history.

(56) References Cited

U.S. PATENT DOCUMENTS 10,236,738 B2 * 3/2019 Tsuiki ...................... H02K 3/28

FOREIGN PATENT DOCUMENTS

| CN | 105191071 A | 12/2015 |
| JP | 54-162841 | 11/1979 |

(Continued)

OTHER PUBLICATIONS

Chinese Office Action dated Sep. 2, 2019, 7 pages.
(Continued)

*Primary Examiner* — Ramon M Barrera
(74) *Attorney, Agent, or Firm* — Rankin, Hill & Clark LLP

(57) ABSTRACT

A stator (1) includes a plurality of divided cores (3) arranged in circumferential direction to constitute a stator core (2), and a holder (4). Stator coils (5) are wound around the individual divided cores (3). The divided core (3) includes a tooth part (6), and an insulator (13) around which the stator coil (5) is wound. A plurality of projection portions (5a) are formed in the stator coil (5) when the stator coil (5) is wound around the insulator (13). The projection portions (5a) are wound on only short sides of the insulator (13), resulting that the stator coil (5) does not protrude from the long sides of the divided core (3), and when the divided cores (3) are arranged in the circumferential direction to constitute the stator (1), the stator (1) is normally driven without the stator coils (5) of the neighboring divided cores (3) contacting each other.

4 Claims, 6 Drawing Sheets

(51) Int. Cl.
*H01F 41/06* (2016.01)
*H02K 15/095* (2006.01)
*H02K 1/18* (2006.01)
H02K 15/00 (2006.01)
H02K 15/02 (2006.01)

(52) U.S. Cl.
CPC ....... *H02K 15/0068* (2013.01); *H02K 15/026* (2013.01)

(56) References Cited

FOREIGN PATENT DOCUMENTS

| | | |
|---|---|---|
| JP | 11-332185 | 11/1999 |
| JP | 3566753 | 9/2004 |
| JP | 2005-130645 | 5/2005 |
| JP | 2008-312345 | 12/2008 |
| JP | 2014-100008 | 5/2014 |

OTHER PUBLICATIONS

International Search Report, dated Apr. 25, 2017 (Apr. 25, 17), 2 pages.
Chinese Office Action dated Jun. 8, 2020, Application No. 201780012457.6, 8 pages.

\* cited by examiner

ROTATIONAL ANGLE OF DIVIDED CORE : 0°
COIL ANGLE θ : 31.77°

ROTATIONAL ANGLE OF DIVIDED CORE : 9.52°
COIL ANGLE θ : 31.58°
COCOIL WIRE SPEED : FASTEST

ROTATIONAL ANGLE OF DIVIDED CORE : 53.6°
COIL ANGLE θ : 31.58°
COCOIL WIRE SPEED : FASTEST

ROTATIONAL ANGLE OF DIVIDED CORE : 129.7°
COIL ANGLE θ : 39.69°
COCOIL WIRE SPEED : SLOWEST

STATOR AND CONDUCTOR-WIRE WINDING METHOD

TECHNICAL FIELD

The present invention relates to a stator and a conductor-wire winding method.

BACKGROUND ART

There is known a stator including a plurality of divided cores that are annularly arranged and constitute a stator core, and an annular holder that is disposed outside the plurality of divided cores and integrally holds the plurality of divided cores. In such a stator, a coil as a conductor wire is wound around the divided core.

A winding device for winding a conductor wire around a divided core feeds out the conductor wire to which a back tension is applied from a nozzle to wind around the divided core (for example, see Patent Literature 1). In a tensioning device in Patent Literature 1, the tension of the conductor wire fed out from the nozzle is kept constant by controlling a rotational torque of a tensioning motor in synchronization with a rotational angle of the divided core and at the corresponding tension set value.

A winding machine disclosed in Patent Literature 2 is configured to wind a conductor wire around a divided core while applying a bobbin-like cud to the conductor wire by pressing the conductor wire fed out from the nozzle toward the divided core side by a support mechanism when the conductor wire is wound around the divided core.

In the winding machine disclosed in Patent Literature 2, the conductor wire formed in a bobbin-like shape that protrudes toward the divided core is satisfactorily in contact with a divided laminated core, thereby capable of providing, higher degree of alignment with high accuracy, and high quality with a higher space fact winding even when the conductor wire has a thick wire diameter.

In recent years, the conductor-wire is wound at high speed to improve the production efficiency. When the tension device of Patent Literature 1 is used to wind the conductor wire at such high speed, the variations in tension cannot be suppressed even if a servo-type device is adopted, and a load is applied between a distal end of the nozzle and a wire material, resulting that the conductor wire cannot be wound at high speed.

In the winding machine disclosed in Patent Literature 2, since the conductor wire fed out from the nozzle is wound around the divided core while being pressed by a support member, a feeding speed of the conductor wire cannot be increased, resulting that the conductor wire cannot be wound at high speed.

CITATION LIST

Patent Literature

Patent Literature 1: Japanese Patent No. 3566753
Patent Literature 2: Japanese Patent Laid-Open No. H11-332185

SUMMARY OF INVENTION

Technical Problem

As a result of concentrated studies, the present inventors have found that when a conductor wire is wound at high speed, particularly, when the conductor wire is wound around a divided core by rotating the rectangular divided core, there could be significant differences in linear speed of the conductor wire depending on the rotational position of the divided core.

If there are significant differences in linear speed of the conductor wire, a projection portion may be formed in the conductor wire due to interference with an end of the nozzle that feeds out the conductor wire. When the projection portions are wound on side surfaces in a circumferential direction of the divided cores that are annularly arranged, the conductor wires wound around the neighboring divided cores in the circumferential direction come into contact with each other, resulting that the stator may not be driven normally.

The present invention has been made in view of such circumstances, and an object thereof is to provide a stator that is normally driven and a conductor-wire winding method even if a projection portion is formed in the conductor wire to be wound around a divided core.

Solution to Problem

In a stator of the present invention in which a plurality of divided cores around which conductor wires are wound are arranged in a circumferential direction, a larger number of a plurality of projection portions formed in the conductor wire are arranged on connection surfaces connecting side surfaces in the circumferential direction of the divided core than on the side surfaces in the circumferential direction.

According to the stator of the present invention, since a larger number of projection portions formed in the conductor wire are wound around the connection surfaces than the side surfaces in the circumferential direction of the divided core, when the plurality of divided cores are arranged in the circumferential direction to constitute the stator, the stator can be normally driven without the projection portions contacting the conductor wires of the neighboring divided cores in the circumferential direction.

It is preferable that the projection portions do not overlap each other in a winding direction of the conductor wire.

Since the projection portions do not overlap each other in the winding direction of the conductor wire, the projection amount can be smaller than that in the case where the projection portions overlap each other.

A conductor-wire winding method of the present invention is a conductor-wire winding method of winding a conductor wire around each of a plurality of divided cores that are arranged in a circumferential direction to constitute a stator, wherein the conductor wire is fed out so that a larger number of a plurality of projection portions formed in the conductor wire are arranged on connection surfaces connecting side surfaces in the circumferential direction of the divided core, than on the side surfaces in the circumferential direction, when the plurality of divided cores are arranged in the circumferential direction to constitute the stator.

According to the conductor-wire winding method of the present invention, a larger number of projection portions formed in the conductor wire may be wound around the connection surfaces in the circumferential direction of the divided core, than around the side surfaces in the circumferential direction of the divided core. Thus, when the plurality of divided cores are arranged in the circumferential direction to constitute the stator, the stator can be normally driven without the projection portions contacting the conductor wires wound around the neighboring divided cores in the circumferential direction.

When the conductor wire fed out from a nozzle is wound around each of the divided cores, the projection portions are formed in the conductor wire due to interference with an end of the nozzle, a length from a distal end of the nozzle to an end of the divided core is α when tension of the conductor wire becomes maximum, a thickness of the conductor wire is T, the number of laminated layers of the conductor wire that is wound around the divided core is L, a length of the side surface in the circumferential direction of the divided core is A, a length of the connection surface of the divided core is B, and n is an integer, it is preferable to satisfy $T \times L + n \times (A+B) \leq \alpha \leq A + n \times (A+B)$ in a case where $(2 \times n+1) \times T \times L \leq A + T \times L$, or $\alpha = A + (T \times L - A)/2 + n \times (A+B)$ in a case where $(2 \times n+1) \times T \times L > A + T \times L$.

Effect of Invention

According to the present invention, the stator can be normally driven even when a projection portion is formed in a conductor wire to be wound around a divided core.

DESCRIPTION OF EMBODIMENT

Hereinafter, an embodiment of the present invention will be described with reference to the drawings.

Figure 1:
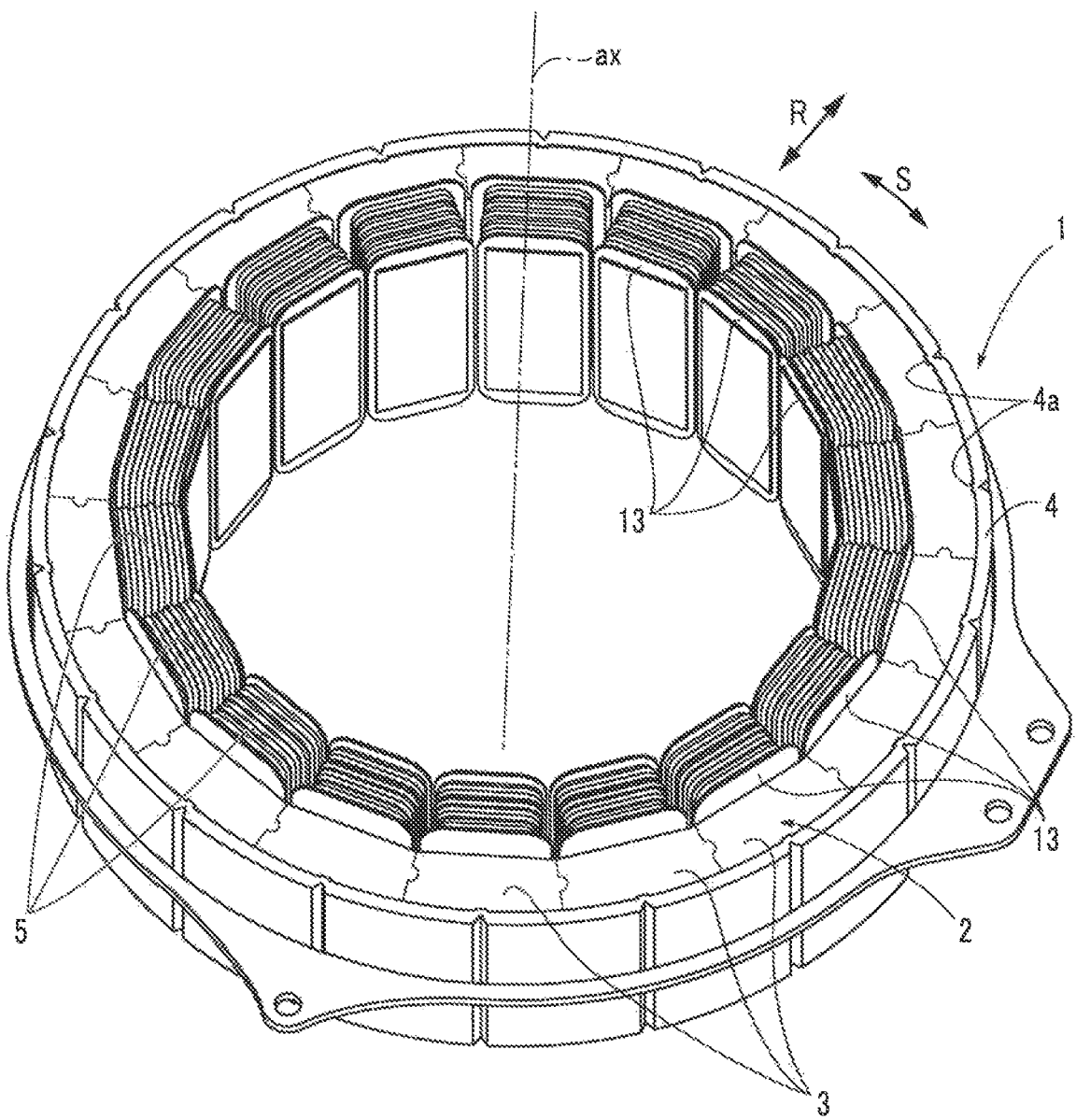
FIG. 1 is a perspective view illustrating a stator of the present invention.

As illustrated in FIG. 1, a stator 1 includes a plurality of divided cores 3 that are arranged in a circumferential direction S to constitute a stator core 2, and a cylindrical holder 4 that is disposed outside the plurality of divided cores 3, and stator coils 5 are wound around the individual divided cores 3.

An inner circumferential surface of the holder 4 is provided with projection parts 4a each to be inserted into a recess part 10 (described later) in the divided core 3.

The arrangement of the divided cores 3 forms a cylindrical outer circumferential surface parallel to a center axis line ax of the stator core 2. The holder 4 has a cylindrical inner circumferential surface that faces this outer circumferential surface, and integrally holds the plurality of divided cores 3 through this inner circumferential surface.

Figure 2:
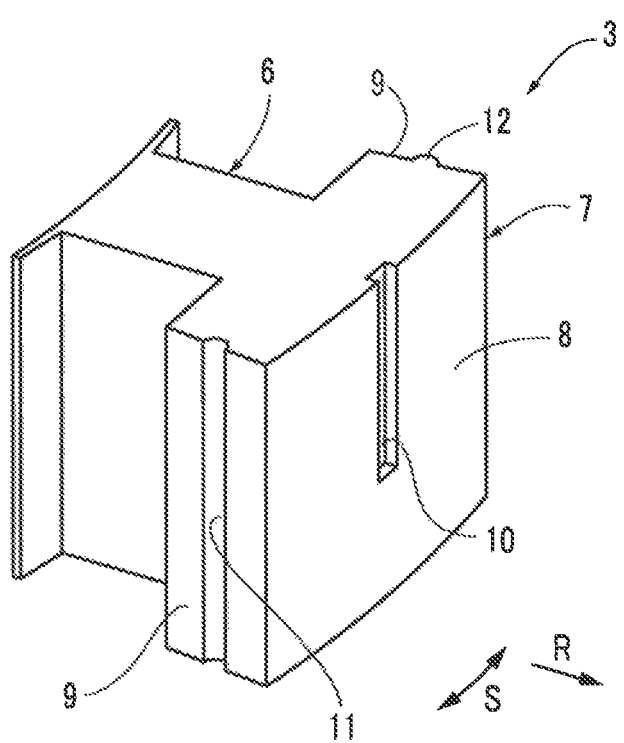
FIG. 2 is a perspective view illustrating a divided core.

As illustrated in FIG. 2, the divided core 3 comprises a tooth part 6, and a yoke part 7 that magnetically connects the tooth parts 6 of the neighboring divided cores 3 to each other.

The yoke part 7 has a substantially rectangular parallelepiped shape, and includes a partially cylindrical facing surface 8 that faces the inner circumferential surface of the holder 4, and joint surfaces 9 that are provided on both sides of the yoke part 7 so as to face the yoke parts 7 of both neighboring divided cores 3, respectively. The neighboring divided cores 3 are connected with each other by bringing their joint surfaces 9 into contact with each other.

The linear recess part 10 parallel to the center axis line ax is provided on the facing surface 8 of the divided core 3. The recess part 10 is positioned at the center of the facing surface 8 in the circumferential direction S of the stator core 2, and is formed to insert the projection part 4a of the holder 4 thereinto.

A recessed groove 11 and a projected ridge 12 that are parallel to the center axis line ax are provided on the joint surfaces 9 on both sides of the divided core 3, respectively. The neighboring divided cores 3 are positioned with respect to each other in a radial direction R around the center axis line ax by engaging the recessed groove 11 in one of the neighboring divided cores 3 with the projected ridge 12 in the other.

The tooth part 6 extends from the center of the yoke part 7 in the circumferential direction S toward the center axis line ax, such that a cross section perpendicular to the center axis line ax forms a substantially T-shape.

The divided core 3 includes an insulator 13 around which the stator coil 5 is wound (see FIG. 1). The insulator 13 is attached to the tooth part 6 to cover the outer circumferential surface of the tooth part 6. The stator coil 5 is wound around an outer circumference of the insulator 13.

A portion of the insulator 13 around which the stator coil 5 is to be wound has a rectangular shape whose four corners are rounded, and long sides of the rectangular shape are close to the neighboring divided cores 3.

A coil winding device 20 that winds the stator coil 5 around the insulator 13 of the divided core 3 will be described below.

Figure 3:
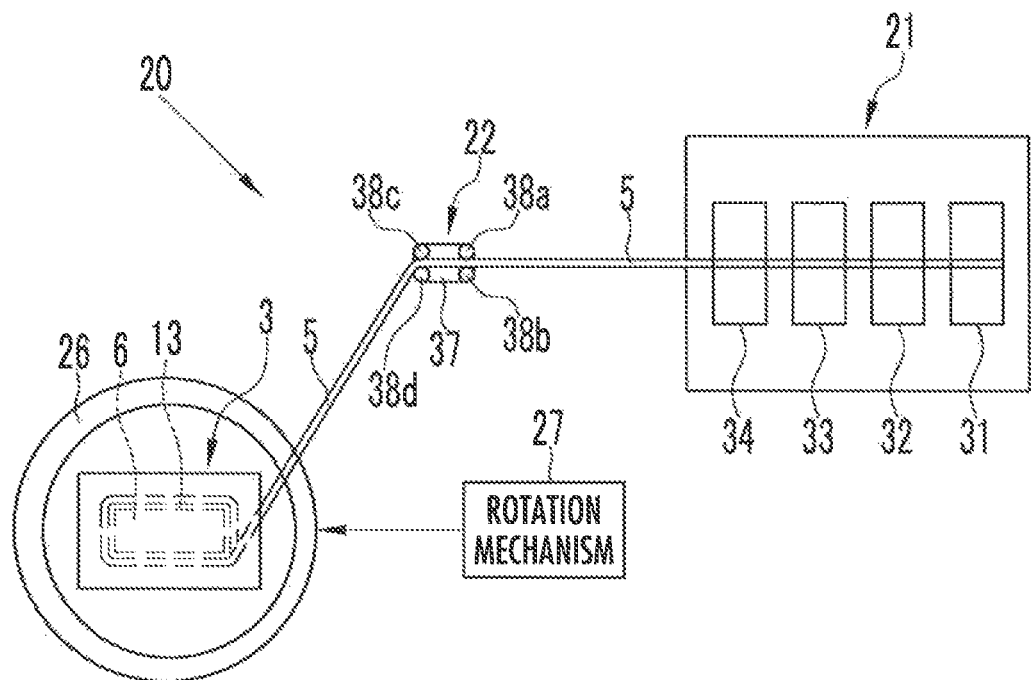
FIG. 3 is a top view illustrating a coil winding device.
Figure 4:
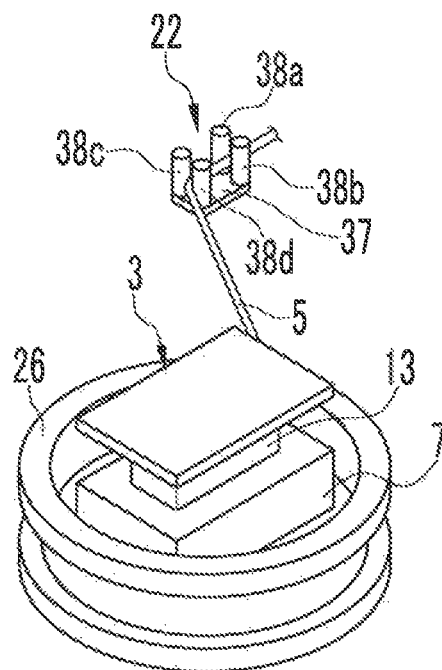
FIG. 4 is a perspective view illustrating the divided core, a stator coil, a nozzle, and a core fixing jig.

As illustrated in FIG. 3 and FIG. 4, the coil winding device 20 includes a coil supply device 21 that supplies the stator coil 5, and a nozzle 22 that feeds out the stator coil 5 supplied from the coil supply device 21.

The coil winding device 20 includes a core fixing jig 26 to which the divided core 3 is detachably fixed and that is rotatably provided, and a rotation mechanism 27 configured by a motor for rotating the core fixing jig 26, a control unit, and the like. The rotation mechanism 27 rotates the core fixing jig 26 when winding the stator coil 5. Note that in FIG. 3, FIG. 4, and FIGS. 6A, 6B, 6C and 6D to 8, the divided core 3, the insulator 13, and the core fixing jig 26 are simplified, and the thickness of the stator coil 5 is exaggerated.

The coil supply device 21 includes a bobbin 31 around which the stator coil 5 is wound and that supplies the stator coil 5, and a wire storage roller unit 32 that stores the stator coil 5 supplied from the bobbin 31 and absorbs a difference between a feed-out amount from the bobbin 31 and a winding take-up amount on the divided core 3. The wire storage roller unit 32 includes two rollers around which the stator coil 5 is trained, and absorbs the difference between the feed-out amount from the bobbin 31 and the winding take-up amount of the divided core 3 by changing a distance between the two rollers.

The coil supply device 21 includes a well-known hysteresis brake 33 that imparts a tension to the stator coil 5, and a well-known back tension device 34 that alleviates variations in tension. The stator coil 5 fed out from the bobbin 31 is fed to the hysteresis brake 33 through the wire storage roller unit 32 so that the hysteresis brake 33 imparts tension, and then is fed to the nozzle 22 in a state where the variations in tension are alleviated by the back tension device 34.

The nozzle 22 includes a base 37, and first to fourth metal rollers 38a to 38d that are rotatably attached to the base 37. The nozzle 22 holds the stator coil 5 between the first roller 38a and the second roller 38b, holds the stator coil 5 between the third roller 38c and the fourth roller 38d, and feeds the stator coil 5 in a state where the stator coil 5 is held when the coil is wound.

The stator coil 5 is inserted into the core fixing jig 26, and a distal end of the stator coil 5 protrudes from the core fixing jig 26. The distal end of the stator coil 5 protruding from the core fixing jig 26 is taken up on a take-up pulley (not illustrated). A proximal end side of the stator coil 5 protrudes from the core fixing jig 26, and is wound around the divided core 3.

To wind the stator coil 5 around the divided core 3, the rotation mechanism 27 rotates the core fixing jig 26 is rotated, and then the divided core 3 attached to the core fixing jig 26. When the divided core 3 is rotated, the stator coil 5 is wound around the insulator 13 of the divided core 3.

When a predetermined amount of the stator coil 5 is wound around the insulator 13, the rotation mechanism 27 stops the rotation of the core fixing jig 26, and transfers a unit composed of the divided core 3 and the take-up pulley to the next process. In the next process, the take-up pulley is removed, and a portion of the stator coil 5 that has been taken up on the take-up pulley is treated, thereby completing the divided core 3 around which the stator coil 5 is wound. The divided core 3 around which the stator coil 5 is wound is transferred to a manufacturing process of the stator 1, to manufacture the stator 1 in which the plurality of divided cores 3 are annularly arranged.

[Experiment]

Figure 5:
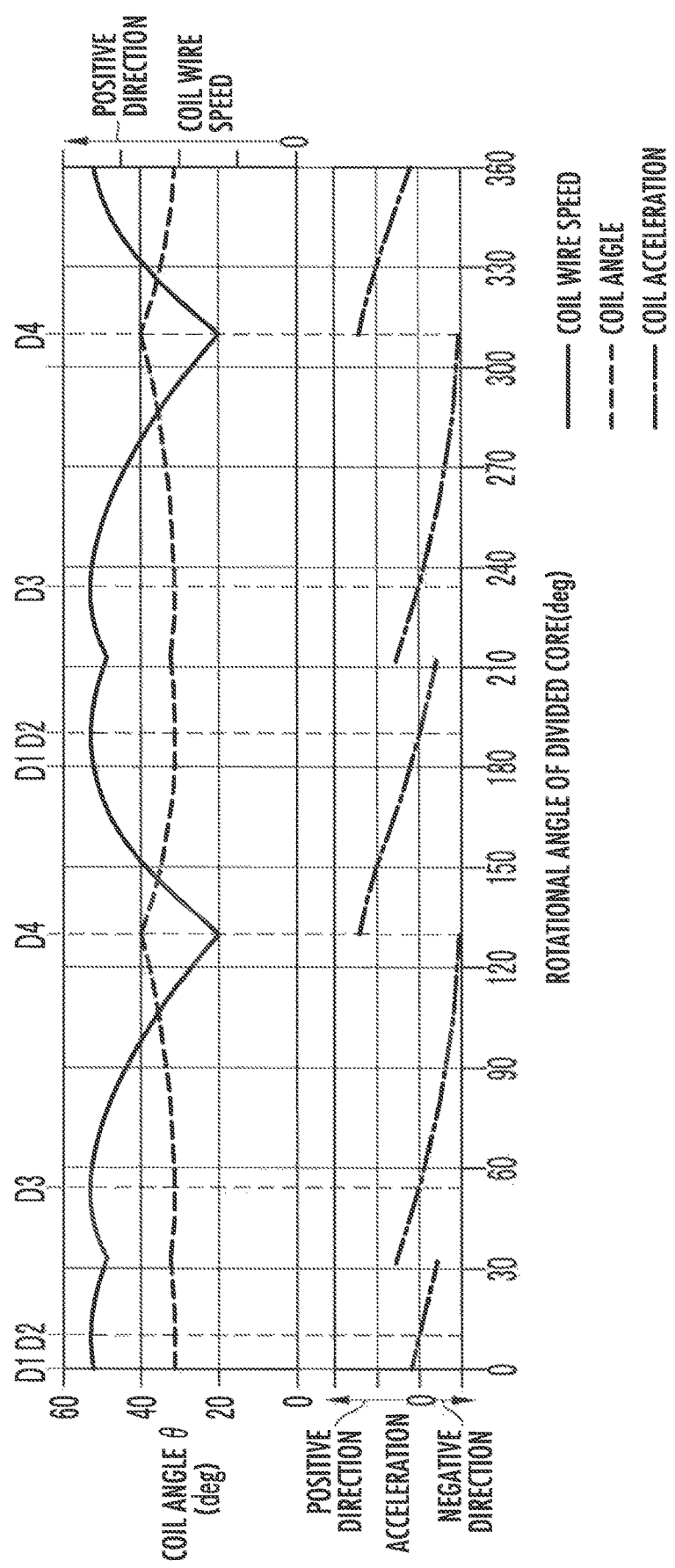
FIG. 5 is a graph showing a coil wire speed, a coil angle, and a coil acceleration when the coil winding device is driven to wind the stator coil around the divided core.

An experiment was conducted in which the coil winding device 20 was driven to rotate the divided core 3 to detect the coil angle θ (deg), the coil wire speed, and the coil acceleration when the stator coil 5 is wound around the divided core 3. These results are shown in FIG. 5 and FIGS. 6A, 6B, 6C, and 6D. Note that the coil angle θ is an angle formed by a portion of the stator coil 5 extending from the divided core 3 to the nozzle 22 (see FIGS. 6A, 6B, 6C, and 6D). In FIG. 5, the coil wire speed and the coil acceleration are presented as ratios in a positive direction and a negative direction from 0 (zero).

Figure 6A:
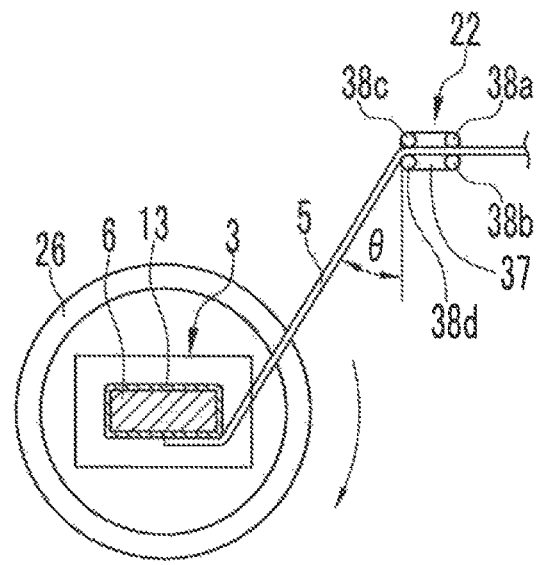
FIG. 6A, FIG. 6B, FIG. 6C, and FIG. 6D are top views illustrating the divided core, the stator coil, the nozzle, and the core fixing jig when the coil winding device is driven to wind the stator coil around the divided core.
Figure 6B:
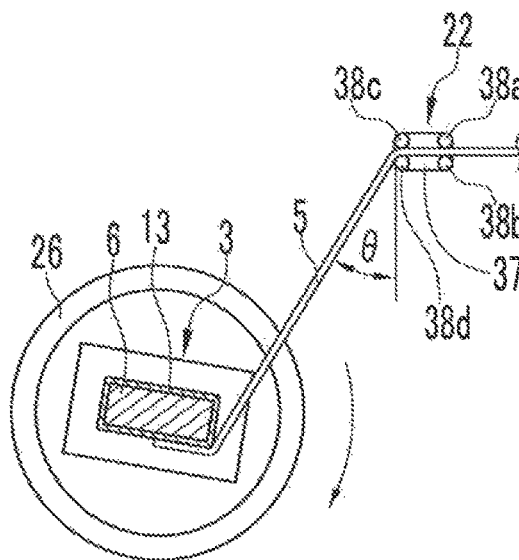

When a rotational angle of the divided core 3 was 0°, the coil angle θ was 31.77 (see D1 in FIG. 5 and FIG. 6A). When the rotational angle of the divided core 3 was 9.52°, the coil angle θ was a minimum angle 31.58°, and the coil wire speed was fastest (see D2 in FIG. 5 and FIG. 6B). Note that the rotational angle of the divided core 3 is a rotational angle in a clockwise direction in FIGS. 6A, 6B, 6C, and 6D. FIGS. 6A, 6B, 6C, and 6D, and FIG. 7 show a state where the distal end of the stator coil 5 is simply attached to the insulator 13.

Figure 6C:
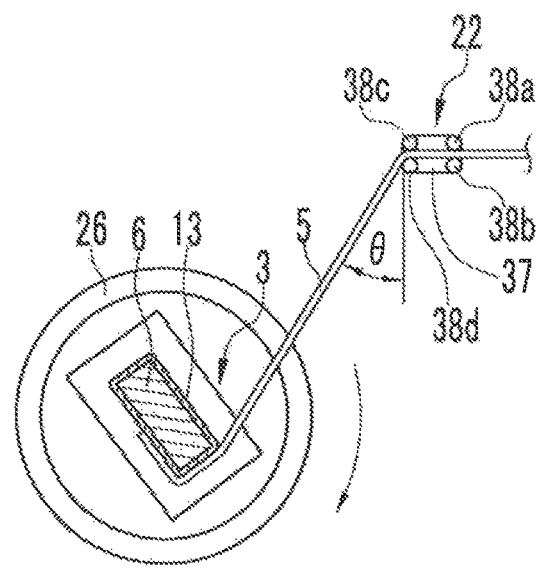

When the rotational angle of the divided core 3 was 53.6°, the coil angle θ was a minimum angle 31.58°, and the coil wire speed was fastest (see D3 in FIG. 5 and FIG. 6C). When the rotational angle of the divided core 3 was 129.7°, the coil angle θ was 39.69°, and the coil wire speed was slowest (see D4 in FIG. 5 and FIG. 6D). The above-described D1 to D4 were repeatedly detected at a pitch of the rotational angle 180° of the divided core 3.

Figure 6D:
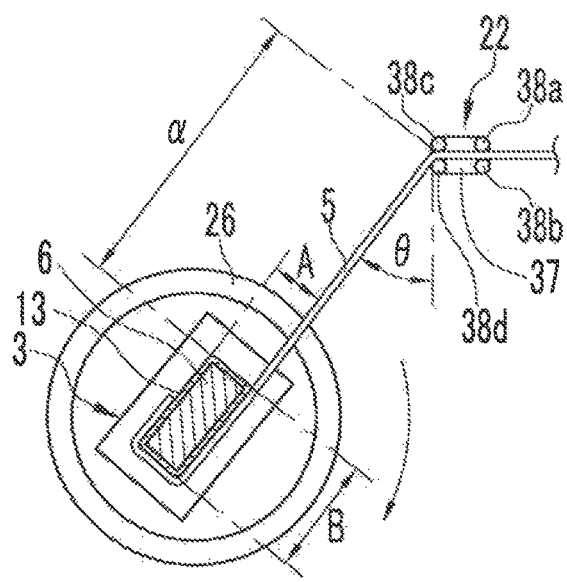
Figure 7:
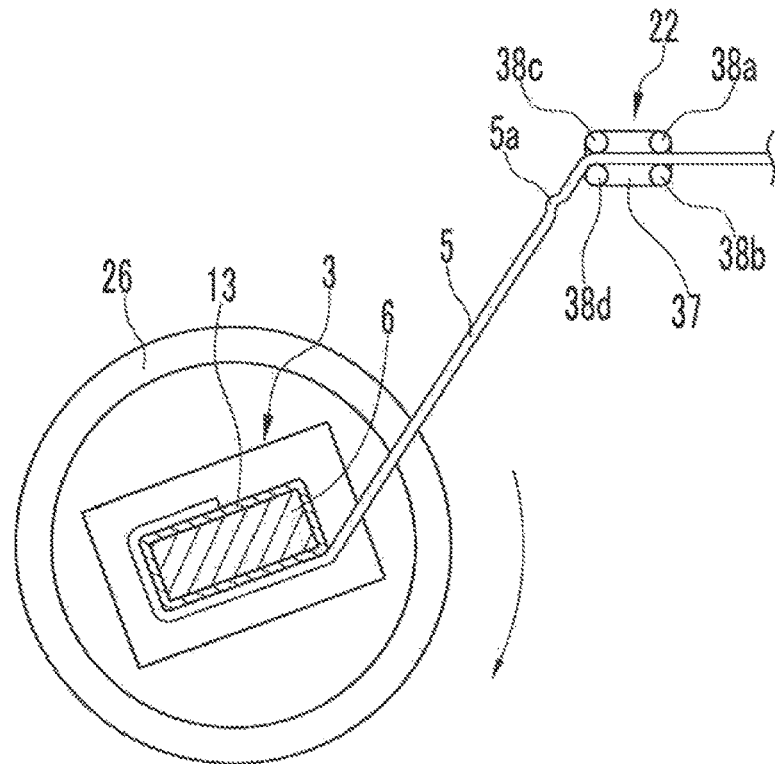
FIG. 7 is a top view illustrating the divided core, the stator coil, the nozzle, and the core fixing jig in a state where a projection portion is generated in the stator coil.

The above experiment shows that the coil acceleration is minimized and the tension of the stator coil 5 is maximized in the state shown in FIG. 6D, and in this state, a projection portion 5a shown in FIG. 7 occurred in the stator coil 5 at a portion held between the third roller 38c and the fourth roller 38d of the nozzle 22.

When the divided core 3 continues to be rotated, the projection portion 5a in the stator coil 5 is wound around the insulator 13. When the projection portion 5a is wound on a long side of the insulator 13 (side surface in the circumferential direction of the divided core), the projection portion 5a protrudes from the long side of the divided core 3, resulting that the projection portion 5a may come into contact with the stator coil 5 of the neighboring divided core 3 when the plurality of divided cores 3 are annularly arranged to constitute the stator core 2. In this case, there was a problem that the stator 1 could not be normally assembled, thereby causing a defective product, or a clearance between the divided cores were larger to prevent the stator coils from interfering with each other, thereby increasing the size of the stator core.

In the present embodiment, to prevent the occurrence of the above problems, a length α from the nozzle 22 to the insulator 13 is defined in the state illustrated in FIG. 6D (a generation point of the projection portion 5a), so that the projection portion 5a is controlled to be wound on a short side (connection surface) of the insulator 13.

When the length of the short side of the insulator 13 is A (mm), the length of the long side of the insulator 13 is B (mm), the thickness of the stator coil 5 is T, and the number of laminated turns of the stator coil 5 when the stator coil 5 is wound and laminated around the insulator 13 is L, the position of the nozzle 22 is defined so that the length α from the nozzle 22 to the insulator 13 in the state illustrated in FIG. 6D is a length calculated by the following (formula 1) or (formula 2).

In the case where $$(2 \times n+1) \times T \times L \leq A + T \times L,$$

$$T \times L + n \times (A+B) \leq \alpha \leq A + n \times (A+B) \quad \text{(formula 1)}$$

In the case where $$(2 \times n+1) \times T \times L > A + T \times L,$$

$$\alpha = A + (T \times L - A)/2 + n \times (A+B) \quad \text{(formula 2)}$$

where n is applicable as long as it is an integer, and it is preferable that it is as small as possible.

When α is calculated by the (formula 1) in the case where $(2 \times n+1) \times T \times L \leq A + T \times L$, all of the projection portions 5a in the stator coil 5 are wound on the short sides of the insulator 13.

For example, when T is 1.03, L is 8, A is 20.6, B is 51.55, and n is 1, $(2 \times n+1) \times T \times L$ is 24.72, and $A + T \times L$ is 28.84, resulting in $(2 \times n+1) \times T \times L$ A+T×L, and a is calculated by the (formula 1). In this case, the result shows $80.39 \leq \alpha \leq 92.75$.

On the other hand, when α is calculated by the (formula 2) in the case where $(2 \times n+1) \times T \times L > A + T \times L$, the projection portions 5a in the stator coil 5 are wound on both of the short side and the long side of the insulator 13. In this case, it is preferable that in the laminated stator coil 5, the projection portion 5a in the stator coil 5 of the first layer is wound on the long side of the insulator 13, and projection portions 5a in the stator coil 5 of the second layer and subsequent layers are wound on the short sides of the insulator 13. In the present invention, a larger number of projection portions 5a should be wound on the short sides than on the long sides of the insulator 13.

For example, when T is 1.03, L is 11, A is 20.6, B is 51.55, and n is 1, $(2\times n+1)\times T\times L$ is 33.99, and $A+T\times L$ is 31.93, resulting in $(2\times n+1)\times T\times L > A+T\times L$, and α is calculated by the (formula 2). In this case, a is 88.115.

Figure 8:
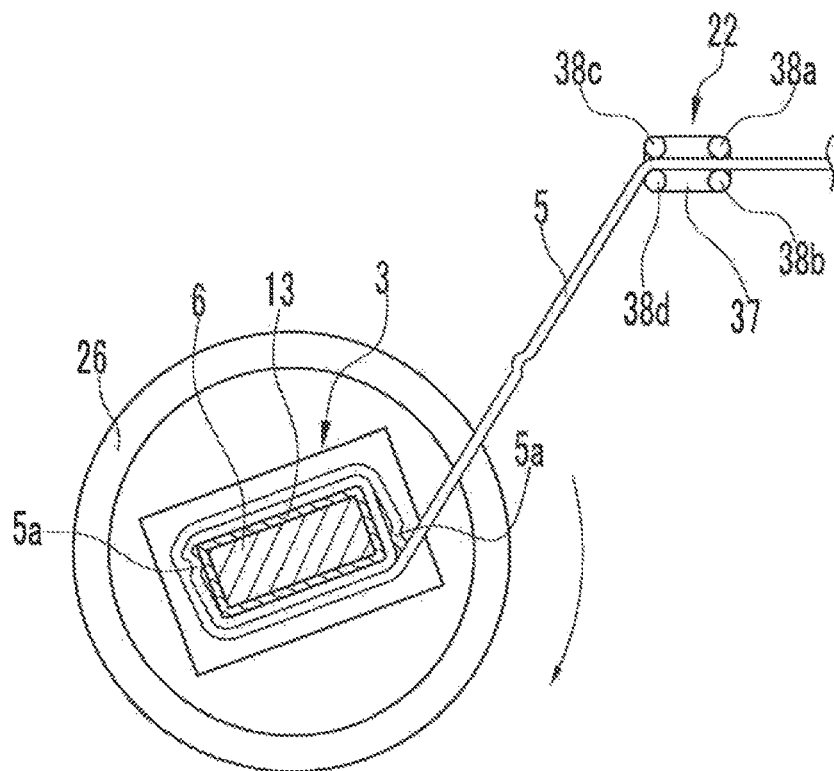
FIG. 8 is a top view illustrating the divided core, the stator coil, the nozzle, and the core fixing jig in a state where the projection portion in the stator coil is wound around the divided core.

When the position of the nozzle 22 is defined so that the length α from the nozzle 22 to the insulator 13 in the state illustrated in FIG. 6D is a length calculated by the above formula (for example, n is 1), two projection portions 5a in the stator coil 5 are wound on the short sides of the insulator 13 as illustrated in FIG. 8. The two projection portions 5a do not overlap each other in the winding direction of the stator coil 5. Note that the two projection portions 5a may overlap each other in the winding direction of the stator coil 5.

Thus, when the coil winding device is set based on the length a calculated by the (formula 1), the projection portions 5a in the stator coil 5 are wound on only short sides of the insulator 13, resulting that the stator coil 5 does not protrude from the long sides of the divided core 3. In this way, when the plurality of divided cores 3 are arranged in the circumferential direction to constitute the stator 1, the stator coils 5 of the neighboring divided cores 3 are not in contact with one another, thereby capable of driving the stator 1 normally.

Since the projection portions 5a in the stator coil 5 do not overlap one another in the winding direction of the stator coil 5, the projection amount can be smaller than that in the case where the projection portions 5a overlap one another.

Note that in the above embodiment, a larger number of the plurality of projection portions formed in the stator coil due to interference with the nozzle are wound on the short sides of the divided core rather than on the long sides, but even if the plurality of projection portions are formed in the stator coil due to other factors, the coil winding device is set so that a larger number of the plurality of projection portions are wound on the short sides of the divided core rather than on the long sides.

REFERENCE SIGNS LIST

1 . . . Stator, 2 . . . Stator core, 3 . . . Divided core, 4 . . . Holder, 5 . . . Stator coil, 5a . . . Projection portion, 6 . . . Tooth part, 7 . . . Yoke part, 13 . . . Insulator, 20 . . . Coil winding device, 21 . . . Coil supply device, 22 . . . Nozzle, 26 . . . Core fixing jig, 27 . . . Rotation mechanism, 31 . . . Bobbin, 32 . . . Wire storage roller unit, 33 . . . Hysteresis brake, 34 . . . Back tension device, 37 . . . Base, 38a to 38d . . . First to fourth rollers

The invention claimed is:

1. A stator in which a plurality of divided cores are arranged in a circumferential direction, each of the divided cores being rotated to wind a conductor wire fed out from a nozzle therearound,
wherein a larger number of a plurality of projection portions formed in the conductor wire when winding around each of the divided cores, are arranged on connection surfaces connecting side surfaces in the circumferential direction of each of the divided cores, than on the side surfaces in the circumferential direction.

2. The stator according to claim 1, wherein the projection portions do not overlap each other in a winding direction of the conductor wire.

3. A conductor-wire winding method comprising:
winding a conductor wire fed out from a nozzle around each of a plurality of divided cores which are being rotated and are arranged in a circumferential direction to constitute a stator,
wherein the conductor wire is fed out so that a larger number of a plurality of projection portions formed in the conductor wire when winding around each of the divided cores, are arranged on connection surfaces connecting side surfaces in the circumferential direction of each of the divided cores, than on the side surfaces in the circumferential direction, when the plurality of divided cores are arranged in the circumferential direction to constitute the stator.

4. The conductor-wire winding method according to claim 3, wherein
when the conductor wire fed out from a nozzle is wound around each of the divided cores,
the projection portions are formed in the conductor wire due to interference with an end of the nozzle,
a length from a distal end of the nozzle to an end of the divided core is a when tension of the conductor wire becomes maximum,
a thickness of the conductor wire is T,
the number of laminated layers of the conductor wire that is wound around the divided core is L,
a length of the side surface in the circumferential direction of the divided core is A,
a length of the connection surface of the divided core is B, and
n is an integer,
$T\times L+n\times(A+B) \leq \alpha \leq A+n\times(A+B)$ is satisfied in a case where $(2\times n+1)\times T\times L \leq A+T\times L$, or
$\alpha = A+(T\times L-A)/2+n\times(A+B)$ is satisfied in a case where $(2\times n+1)\times T\times L > A+T\times L$.

* * * * *